(12) United States Patent
Knoop et al.

(10) Patent No.: US 12,305,572 B2
(45) Date of Patent: May 20, 2025

(54) DRIVE SYSTEM FOR A VEHICLE

(71) Applicant: Obrist Technologies GMBH, Lustenau (AT)

(72) Inventors: Andreas Knoop, Esslingen (DE); Frank Obrist, Bregenz (AT)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 0 days.

(21) Appl. No.: 18/687,595

(22) PCT Filed: Aug. 12, 2022

(86) PCT No.: PCT/EP2022/072672
§ 371 (c)(1),
(2) Date: Feb. 29, 2024

(87) PCT Pub. No.: WO2023/030867
PCT Pub. Date: Mar. 9, 2023

(65) Prior Publication Data
US 2024/0360789 A1   Oct. 31, 2024

(30) Foreign Application Priority Data

Sep. 1, 2021   (DE) ..................... 10 2021 122 631.7

(51) Int. Cl.
*F02C 6/20*    (2006.01)
*F02C 6/18*    (2006.01)
*F02C 7/08*    (2006.01)

(52) U.S. Cl.
CPC .................. *F02C 6/20* (2013.01); *F02C 6/18* (2013.01); *F02C 7/08* (2013.01)

(58) Field of Classification Search
CPC .... C01B 2203/0205; C01B 2203/1223; B60K 3/00; B60K 3/04; F02C 6/18; F02C 6/20; F02C 7/08; F02C 7/224; F02C 3/24
See application file for complete search history.

(56) References Cited

U.S. PATENT DOCUMENTS 6,260,348 B1 *  7/2001  Sugishita .................. C01B 3/32
                                              60/39.12
6,606,864 B2 *  8/2003  MacKay .................. F02C 7/10
                                              60/773

(Continued)

FOREIGN PATENT DOCUMENTS

JP    2001/221062 A     8/2001
WO    WO-2008/087685 A2 7/2008
WO    WO-2020/249599 A1 12/2020

*Primary Examiner* — David P. Olynick
(74) *Attorney, Agent, or Firm* — Cesari and McKenna, LLP (57) ABSTRACT

The disclosure relates to a drive system for a vehicle, in particular for a hybrid vehicle, with at least one power unit and at least one drive battery, which are electrically coupled to one another. The power unit includes at least one gas turbine, which has at least one first compressor for compressing aspirated combustion air, at least one turbine for driving the first compressor and at least one combustion chamber, arranged in between, which is intended for burning an air/fuel mixture and is fluid-connected to the first compressor (32) and the turbine (33). The power unit also includes at least one reformer for reforming a vaporized fuel, in particular vaporized methanol, into a synthesis gas, wherein the reformer is connected to the combustion chamber for supplying the synthesis gas and at least one generator, which is mechanically coupled to the gas turbine for accepting and/or introducing a rotary movement. The drive battery is electrically connected to the generator of the power unit and is adapted to supply electrical energy to at least one electric motor for driving the vehicle and/or to the generator.

20 Claims, 3 Drawing Sheets

(56) References Cited

U.S. PATENT DOCUMENTS

2001/0023580 A1    9/2001   Sugishita et al.
2019/0291595 A1    9/2019   Ruan et al.
2021/0348557 A1*   11/2021   Akbari ..................... F02C 3/02

* cited by examiner

DRIVE SYSTEM FOR A VEHICLE

CROSS REFERENCE TO RELATED APPLICATIONS

This application is the National Stage of International Application No. PCT/EP2022/072672, filed Aug. 12, 2022, which claims the benefit of German Patent Application Ser. No. 102021122631.7 filed on Sep. 1, 2021. The contents of both applications are hereby incorporated by reference in their entirety.

TECHNICAL FIELD

The invention relates to a drive system for a vehicle, a method for operating a drive system, a vehicle and the use of such a drive system in a vehicle.

BACKGROUND

The present development with regard to the discussion about climate-friendly mobility and the technical further development of purely electric drive systems have brought forth solutions in which a combustion engine drives a generator. This in turn feeds a drive battery with generated electrical energy, which makes available to at least one electric motor the stored electrical energy for driving, for example, wheels of a passenger vehicle. Such power units are basically known from the prior art. In particular, DE 10 2014 115 042 A1, DE 10 2014 115 041 A1, DE 10 2014 115 044 A1 and EP 2 633 166 B1, traced back to the applicant, describe such power units. The known power units are able to be used in a variety of ways. These preferably come into use in hybrid vehicles.

SUMMARY

The invention is based on the problem of providing a drive system for a vehicle with an entirely new approach, which is able to be operated in a climate-friendly and efficient manner. The invention is further based on the problem of providing a method for operating a drive system, a vehicle and the use of a drive system in a vehicle.

According to the invention, this problem is solved with regard to the drive system by the subject of claim 1. With regard to the method, the vehicle and the use, the above-mentioned problem is solved respectively by the subject of claim 12 (method), claim 14 (vehicle) and claim 15 (use).

Specifically, the problem is solved by a drive system for a vehicle, in particular for a hybrid vehicle, with at least one power unit and at least one drive battery, which are electrically coupled to one another, wherein the power unit comprises:

- at least one gas turbine, which has at least one first compressor for compressing aspirated combustion air, at least one turbine for driving the first compressor and at least one combustion chamber, arranged in between, which is intended for burning an air/fuel mixture and is fluid-connected to the first compressor and the turbine;
- at least one reformer for reforming a vaporized fuel, in particular vaporized methanol, into a synthesis gas, wherein the reformer is connected to the combustion chamber for supplying the synthesis gas; and
- at least one generator, which is mechanically coupled to the gas turbine for accepting and/or introducing a rotary movement, wherein the drive battery is electrically connected to the generator of the power unit and is adapted to supply electrical energy to at least one electric motor for driving the vehicle and/or to the generator.

The drive system according to the invention is based on the basic idea of generating the electrical energy for an electrically driven vehicle using a gas turbine and a generator. The gas turbine and the generator form here a turbine/generator unit. The turbine/generator unit serves only for the generating of electrical energy, so that the actual drive power for the vehicle takes place purely electrically. The drive system according to the invention is able to be used in a variety of ways. In particular, the drive system can come into use in hybrid vehicles, for example a passenger vehicle, a truck, a bus, a watercraft or respectively boat and/or an aircraft.

The use of the reformer is particularly advantageous, which is adapted to reform a vaporized fuel. Thereby, a synthesis gas with a higher heating value than the starting educt can be produced from the vaporized fuel. This increases the efficiency of the gas turbine and thus of the entire power unit. The drive system according to the invention therefore has an increased efficiency through the combination of the gas turbine with the reformer. Particularly preferably, the vaporized fuel consists of vaporized methanol. At least two types of synthesis gas with increased heating value are able to be produced from the vaporized methanol through the reformer. Thereby, the operating variability of the gas turbine is increased.

Methanol is a fuel which is very easy to produce and synthesize on the basis of hydrocarbon and/or alcohol. In particular, the CO: balance for the operation of the vehicle is thereby able to be lowered or respectively compensated when the methanol is produced through regenerative energy. In this way, a particularly climate-friendly operation of a vehicle equipped with the drive system is possible.

The generator is mechanically coupled to the gas turbine in order to receive the rotary movement of the gas turbine or respectively to set the gas turbine in rotation. For this, the generator can be directly connected to a turbine shaft of the gas turbine. More specifically, the generator can be directly connected with its generator shaft to the turbine shaft. This has the advantage that rotation speeds of the gas turbine are able to be directly converted through the generator into electrical energy without transmission losses. In particular, it is possible that rotation speeds of up to 100000 $min^{-1}$ (revolutions per minute) are able to be directly converted into electrical energy. This has the advantage that transmissions with large constructions and with a high weight are dispensed with.

Alternatively, it is possible that the generator is mechanically coupled to the gas turbine via a transmission. Thereby, rotation speeds of the gas turbine can be transmitted in a manner specific to requirements, in order to enable the use of smaller generators. It is possible that the power unit has several, in particular two, generators, which are mechanically coupled to the gas turbine for receiving and/or introducing a rotary movement.

Generally, the generator serves for the conversion of a rotary movement of the gas turbine into electrical energy, which is stored in the drive battery. This concerns a normal operation of the power unit. The generator is also able to be operated as a motor. In other words, the generator can be operated as an electric motor which drives the gas turbine. This is necessary in a start-up phase of the gas turbine in order to set the gas turbine in rotation and thus to start the gas turbine process (normal operation). When this has taken place, the generator switches from the motor operation into the generator operation and then generates electrical energy.

As the generator is electrically connected to the drive battery, this supplies the generator for the motor operation in the start-up phase of the gas turbine with electrical energy. In normal operation, the drive battery receives the electrical energy generated by the generator and stores it. The drive battery makes the electrical energy available for the electric motor for driving the vehicle. For this, the drive battery is preferably connected to the electric motor. Generally, it is possible that the drive battery is connected to several electric motors for driving the vehicle. The drive system according to the invention can also comprise several drive batteries which are electrically connected to the generator. This enables the use of several smaller dimensioned batteries.

In operation, a first compressor of the gas turbine aspirates combustion air and compresses it. The combustion air is air which is aspirated from the environment of the gas turbine. Subsequently, the compressed combustion air is fed to the combustion chamber. Parallel to the compressing of the combustion air, the reforming of the vaporized fuel takes place through the reformer. The synthesis gas which is generated at the reforming is fed to the combustion chamber as gaseous fuel. In the combustion chamber the compressed combustion air and the gaseous fuel or respectively the generated synthesis gas mix to an air/fuel mixture which is ignited in the combustion chamber. The burnt air/fuel mixture flows as exhaust gas subsequently into the turbine and drives the turbine via turbine blades, to which turbine the at least one generator is mechanically coupled.

The drive system is preferably a serial hybrid drive system. In other words, the turbine generator unit is connected in series to the drive battery and to the at least one electric motor. In operation, therefore, the turbine generator unit does not drive the vehicle directly, but rather only provides electrical energy which is then retrieved via the drive battery as buffer store by the at least on electric motor and converted into kinetic energy of the vehicle.

A further advantage of the serial hybrid drive system consists in that through the turbine generator unit, in contrast to purely electric drive systems, the drive battery can be designed smaller. As the drive battery forms a large part of the weight of the vehicle, weight can thus be reduced.

For the realization of a serial hybrid drive system it is particularly preferred if the gas turbine of the turbine generator unit drives the at least one generator exclusively. When the vehicle is equipped with a turbine generator unit which has several, in particular two, generators, the gas turbine can drive the generators exclusively.

In a preferred embodiment the gas turbine comprises at least one guiding device for guiding the flow of the burnt air/fuel mixture, in particular of the exhaust gas, which is arranged in flow direction between the combustion chamber and the turbine. The guiding device is upstream of the reformer in a fuel flow direction and is adapted to receive, in operation, heat from the burnt air/fuel mixture and through heat transmission to vaporize a liquid fuel, in particular liquid methanol. The guiding device directs the burnt air/fuel mixture to turbine blades of the turbine. The guiding device is preferably directly upstream of the turbine blades in flow direction. The guiding device is preferably arranged at the turbine inlet of the turbine. The guiding device is arranged in fuel flow direction before the reformer. The guiding device is preferably at least one guide baffle for guiding flow.

In this embodiment, the guiding device fulfils a dual function. On the one hand, the guiding device brings the flow of the burnt air/fuel mixture into a predetermined flow course before the entry into the turbine. For example, the guiding device converts the potential energy from the combustion chamber into kinetic energy, which is then converted through the turbine into torque. On the other hand, the guiding device provides a heat transfer from the hot exhaust gas to the liquid fuel, by which the liquid fuel vaporizes. For this, the guiding device is preferably connected through at least a first flow path with the combustion chamber and with the turbine, and the guiding device is connected through at least a second flow path with a fuel supply, in particular a fuel tank, and with the reformer.

The guiding device must withstand high thermal stresses in operation. In order to protect the guiding device from a thermal overload, provision is made to cool the guiding device with the liquid fuel. The liquid fuel is preferably liquid methanol or a liquid methanol/water mixture. The liquid fuel cools the guiding device through contact and, in so doing, vaporizes. This is also designated as evaporative cooling. Subsequently, the vaporized fuel is fed to the reformer. The cooling of the guiding device thus brings about the increasing of the lifespan of the guiding device and the vaporizing of the liquid fuel for the subsequent synthesis gas production. This process corresponds to a thermochemical recuperation.

Particularly preferably, the guiding device has a plurality of guide blades with respectively at least one passage which is connected to a feed line for liquid and/or pre-vaporized fuel and to a discharge line for vaporized fuel. In other words, each guide blade has at least one passage. The passage preferably forms a heat transfer zone for vaporizing the liquid fuel. The passage preferably has at least one surface for heat transfer. The guide blades are preferably constructed to be hollow. The passage can be slit-shaped. Additionally or alternatively, the passage can be formed by a bore. The passage through the guide blades enables a heat transfer from all sides transversely to the fuel flow direction. It is advantageous here that as large an area as possible is provided at the guide blades in order to receive heat from the exhaust gas and to deliver it to the through-flowing fuel for vaporizing.

In a preferred embodiment, the reformer is adapted to generate from the vaporized fuel, in particular from the vaporized methanol, a synthesis gas with a heating value which is 10 percent to 25 percent, in particular 13 percent to 20 percent, higher than a heating value of the vaporized fuel. The heating value of the synthesis gas can be 12 percent to 23 percent, in particular 14 percent to 21 percent, higher than a heating value of the vaporized fuel. Preferably, the heating value of the synthesis gas can be 16 percent to 19 percent, in particular 17 percent or 18 percent, higher than a heating value of the vaporized fuel.

With a synthesis gas which is generated by the reformer from vaporized methanol, the heating value is higher by 15 percent to 18 percent, particularly preferably by 18 percent to 20 percent, than the heating value of the vaporized methanol before the reforming.

The reaction equation (Equation 1.) for methanol to synthesis gas is as follows:

$$CH_4O \rightarrow 2H_2 + CO. \qquad \text{Equation 1}$$

With a synthesis gas which is generated by the reformer from a vaporized methanol/water mixture, the heating value is higher by 10 percent to 12 percent, preferably by 12 percent to 14 percent, particularly preferably by 13 percent, than the heating value of the vaporized methanol/water mixture before the reforming. The water content of the methanol/water mixture can be already added to the methanol before the vaporization or added after the vaporization.

The reaction equation (Equation 2.) for the methanol/water mixture to synthesis gas is as follows:

$$CH_4O + H_2O \rightarrow 2H_2 + CO_2 + 3H_2.\qquad\text{Equation 2}$$

In the following table (Table 1) the heating values or respectively molar weights of the vaporized fuels, i.e. of the vaporized methanol and vaporized methanol/water mixture, and of the synthesis gases generated therefrom, are listed. On the basis of the heating values, shown therein, in kJ/mol (kilojoule per mole), the heating value increases described above can be calculated in percent.

TABLE 1

|  | Heating value [MJ/kg] | Molar weight [g/mol] | Heating value [kJ/mol] |
| --- | --- | --- | --- |
| COH4 | 19.9 | 32 | 637 |
| CO | 10.1 | 28 | 283 |
| H2 | 120 | 2 | 240 |
| 2H2 + CO |  |  | 763 |
| 3H2 |  |  | 720 |

The power unit can have at least one condensation unit for generating condensate from an exhaust gas flow of the gas turbine, which at the exhaust gas side is connected to the gas turbine or is arranged on the gas turbine. The condensation unit can be arranged on the gas turbine at the exhaust gas side. In addition, the power unit can comprise at least one feed unit for feeding the condensate to the liquid and/or vaporized fuel. Through the condensation unit, using the exhaust gas flow, consisting of the burnt air/fuel mixture, water is condensed out which can subsequently be fed through the feed unit to the methanol for forming a methanol/water mixture. In this embodiment, the heat of the exhaust gas flow is therefore used in order to obtain water for the vaporized fuel mixture which is to be reformed. Therefore, separate components for condensate recovery can be dispensed with, so that the complexity of the system is reduced.

Preferably, the power unit has at least one electric vaporizer for vaporizing the liquid fuel, in particular in the starting phase of the power unit, which is upstream of the guiding device in the direction of fuel flow. In the start-up phase of the gas turbine, the guiding device has a temperature which is not yet sufficient for a vaporizing of the liquid fuel. In this phase the electric vaporizer comes into use which vaporizes the liquid fuel in flow direction before the guiding device. In normal operation the electric vaporizer is preferably deactivated. It is thus ensured in a simple manner that the gas turbine process begins.

In an embodiment the power unit has at least a second compressor, in particular an exhaust gas turbocharger, and at least one air cooler, which are arranged between the first compressor and the combustion chamber in flow direction of the combustion air. The air cooler is preferably upstream of the second compressor. The air cooler is preferably an air/air cooler. In other words, the air cooler cools the combustion air, compressed by the first compressor, by means of ambient air flowing through the air cooler. Through the second compressor, a second compression stage takes place after the first compression stage through the first compressor. In other words, through the two compressors a two-stage compression of the combustion air is formed before entry into the combustion chamber. The air cooler forms an intermediate cooling for the combustion air. Through the two-stage compressing of the combustion air with intermediate cooling, an increase in efficiency of the gas turbine of ca. 10 percent is achieved.

In a further embodiment, the power unit has at least one heat exchanger, in particular an exhaust gas heat exchanger, for the pre-heating of compressed combustion air, which is arranged between the first compressor and the combustion chamber. Alternatively, the heat exchanger, in particular exhaust gas heat exchanger, for the pre-heating of compressed combustion air, can be arranged between the second compressor and the combustion chamber. The heat exchanger is preferably connected to the gas turbine on the exhaust gas side for heat transfer. The heat exchanger uses the temperature of the exhaust gas flow or respectively of the burnt air/fuel mixture in order to heat the compressed combustion air before entry into the combustion chamber. Through this thermal recovery, an increase in efficiency of the gas turbine of 10 percent to 15 percent is achieved.

The heat exchanger is preferably adapted to heat the compressed combustion air at least to an ignition temperature of the synthesis gas generated by the reformer. Additionally or alternatively, the combustion chamber is adapted to accelerate the combustion air to a speed which is higher than a flame speed of the synthesis gas which is to be burned. These two requirements are necessary in order to enable a flameless oxidation in the combustion chamber which has the advantage that almost no nitrogen oxides occur during the combustion of the air/fuel mixture.

Preferably at least one electric motor is provided for driving the vehicle, in particular hybrid vehicle, which is connected to the drive battery. The electric motor is provided as drive motor for the vehicle. It is possible that several electric motors are provided for driving the vehicle, which are electrically connected to the drive battery or to several drive batteries.

According to a subordinate aspect, the invention relates to a method for operating a drive system, in particular a drive system according to the invention, which has at least one power unit with at least one gas turbine, at least one reformer and at least one generator, and at least one drive battery electrically connected to the power unit, wherein the method comprises the following steps:

aspirating of combustion air through at least a first compressor of the gas turbine and compressing of the combustion air;

feeding the compressed combustion air to a combustion chamber which is arranged between the first compressor and a turbine of the gas turbine;

vaporizing a liquid fuel, in particular of liquid methanol, through at least one guiding device which, in operation, receives heat from a burnt air/fuel mixture from the combustion chamber and transfers it to the throughflowing fuel;

feeding the vaporized fuel to the reformer, which converts the vaporized fuel into a synthesis gas and feeds the latter to the combustion chamber;

burning the air/fuel mixture in the combustion chamber and driving the turbine of the gas turbine;

transferring a rotary movement from the gas turbine to the generator for the generating of electrical energy;

and storing the electrical energy in the drive battery which is electrically connected to the generator, in order to supply at least one electric motor and/or the generator with electrical energy.

In a preferred embodiment of the method according to the invention, before feeding to the combustion chamber, the compressed combustion air is further compressed through at least a second compressor, in particular an exhaust gas turbocharger, of the power unit. Here, before the further compression, the combustion air is cooled by at least one air cooler which is arranged between the first compressor and the second compressor in flow direction of the combustion air.

According to a further subordinate aspect, the invention relates to a vehicle, in particular a hybrid vehicle, with at least one drive system according to the invention and at least one electric motor which is connected to the drive battery of the drive system for driving the vehicle.

According to a further subordinate aspect, the invention relates to the use of at least one drive system according to the invention in a vehicle, wherein the power unit generates electrical energy and the drive battery stores the electrical energy, wherein the drive battery is connected to at least one electric motor for driving the vehicle. The vehicle can be a passenger car and/or a truck and/or a bus. Alternatively, the drive system according to the invention can be used in an aircraft and/or in a boat.

With regard to the advantages of the method, of the vehicle and of the use, reference is to be made to the advantages explained in connection with the drive system. Furthermore, the method and the vehicle can have, alternatively or additionally, individual features or a combination of several features previously mentioned with respect to the drive system.

BRIEF DESCRIPTION OF THE DRAWINGS

The invention is explained more closely below with further details with reference to the enclosed drawings. The illustrated embodiments represent examples of how the drive system according to the invention can be configured.

In these, there are shown.

DESCRIPTION

Figure 1:
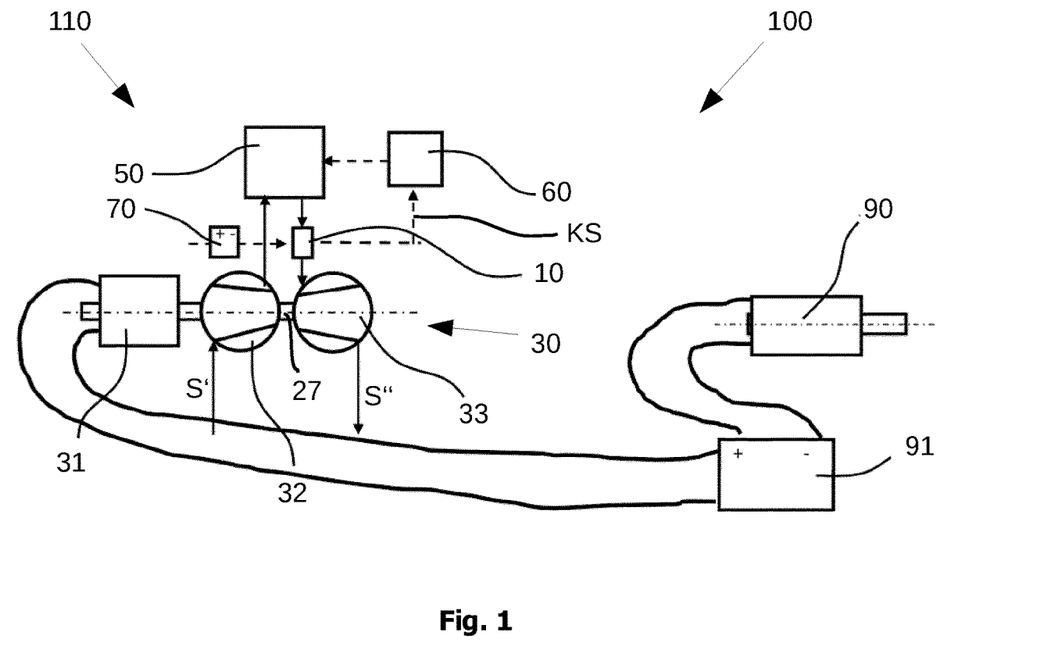
FIG. 1 a schematic illustration of a drive system according to a preferred example embodiment according to the invention.

FIG. 1 shows a drive system 100 according to a preferred example embodiment according to the invention, which is designed for driving a vehicle. The drive system 100 comprises a power unit 110 and a drive battery 91 which supplies an electric motor 90 with electrical energy for driving the vehicle. Preferably the drive system 100 is used in hybrid vehicles, such as for example a passenger car, truck, bus, boat and/or aircraft. The use in agricultural and/or construction machines is also possible. Other cases of application for the drive system 100 are conceivable.

The power unit 110 has a gas turbine 30, a generator 31 mechanically coupled to the gas turbine 30, and a reformer 60. The gas turbine 30 comprises a first compressor 32 for compressing aspirated combustion air, and a turbine 33 for driving the first compressor 32. According to FIG. 3, the turbine 33 is a radial turbine. Between the first compressor 32 and the turbine 33 a combustion chamber 50 is arranged which is fluid-connected to the first compressor 32 and the turbine 33. In other words, the first compressor 32 is upstream of the combustion chamber 50 in a flow direction S' of the combustion air. The combustion chamber 50 serves for burning an air/fuel mixture which consists of fed combustion air and fed synthesis gas. The turbine 33 is downstream of the combustion chamber 50 in a flow direction S" of the burnt air/fuel mixture.

The synthesis gas is generated by the reformer 60, whereby for this a vaporized fuel is fed to the reformer 60. The reformer 60 serves for reforming the vaporized fuel to synthesis gas, in order to increase a heating value for the combustion. The reformer 60 is connected to the combustion chamber 50 for feeding the generated synthesis gas. The synthesis gas and the reformer 60 will be discussed more closely later.

The generator 31 is connected to the gas turbine 30 such that it receives a rotary movement in operation and converts it into electrical energy. This constitutes the normal operation of the generator 31. The generator 31 is electrically connected to the drive battery 91. As can be seen in FIG. 1, the drive battery 91 is connected to an electric motor 90 by electrical lines, in order to supply it with electrical energy for driving the vehicle.

The generator 31 is also operable as a motor. In other words, the generator 31 can be operated as an electric motor which drives the gas turbine 30. Here, a pre-vaporization of the liquid fuel can be achieved through an electric vaporizer 70. This is expedient in a start-up phase of the gas turbine 30, in order to set the gas turbine 33 in rotation and thereby to transfer it into normal operation. When this has taken place, the generator 31 switches from the motor operation into the generator operation and then generates electrical energy.

The generator 31 can be directly connected to the turbine 33, specifically with a turbine shaft 27 of the turbine 33, in order to receive the rotary movement of the gas turbine 30. However, it is also possible that a transmission is interposed between the gas turbine 30 and the generator 31, in order to transfer the rotation speed of the turbine shaft 27. In other words, the generator 31 can be indirectly connected to the turbine shaft 27 of the turbine 33 for receiving the rotary movement.

Figure 2:
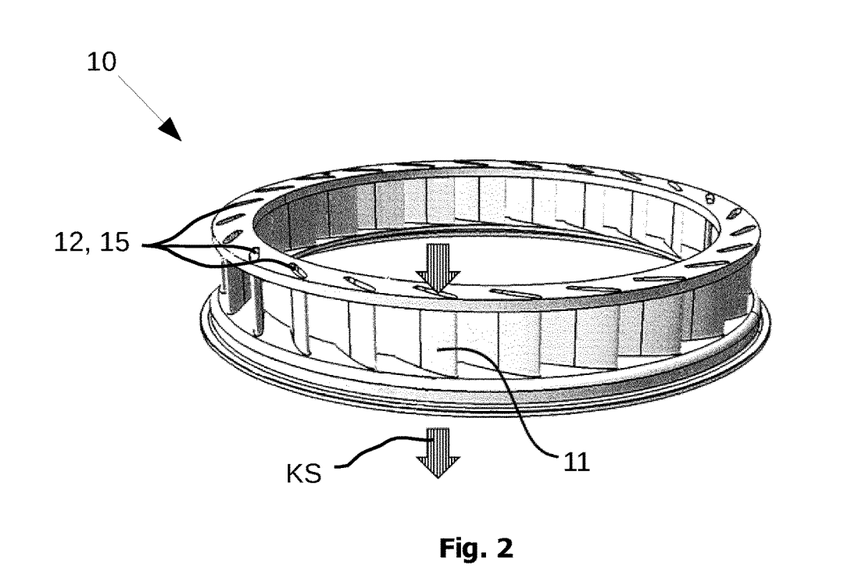
FIG. 2 a perspective illustration of a guiding device of the drive system according to FIG. 1.
Figure 3:
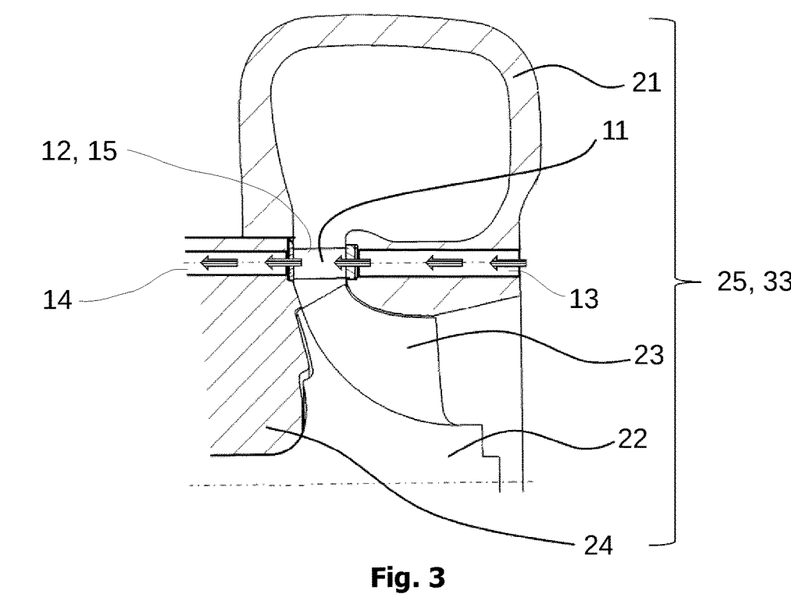
FIG. 3 a partial section of a turbine with used guiding device of the drive system according to FIG. 1.

As can be seen in FIGS. 2 and 3, the gas turbine 30 has a guiding device 10 for flow guiding, which is upstream of the turbine 33. The guiding device 10 is connected in flow direction S" of the burnt air/fuel mixture between the combustion chamber 50 and the turbine 33. Specifically, the guiding device 10 is arranged at an inlet of the turbine 33. The guiding device 10 guides a flow of the burnt air/fuel mixture in a predetermined flow course to turbine blades 23 of the turbine 33. The guiding device 10 is illustrated in FIG. 2 in uninstalled state, for better illustration. The configuration of the guiding device 10 is described more closely later.

According to FIG. 3 the guiding device 10, in particular in installed state, is arranged between a turbine volute 21 and a turbine wheel 22 of the turbine 33. The turbine wheel 22 has the turbine blades 23 and rotates in operation in a bearing support 24 which can be readily seen in FIG. 3. Through the turbine volute 21 the burnt air/fuel mixture flows to the guiding device 10 and subsequently to the turbine blades 23 of the turbine 33.

In FIG. 3 furthermore a feed line 13 can be seen for the feeding of liquid or respectively pre-vaporized fuel to the guiding device 10, and a discharge line 14 for vaporized fuel. The discharge line 14 connects the guiding device 10 with the reformer 60. The feed line 13 is connected to an electric vaporizer 70, which in the start-up phase or respectively in the start phase of the gas turbine process pre-vaporizes the liquid fuel. The electric vaporizer 70 is upstream of the guiding device 10 in fuel flow direction KS. The guiding device 10 is furthermore upstream of the reformer 60. As can be seen in FIG. 1, the guiding device 10 is arranged in fuel flow direction KS between the electric vaporizer 70 and the reformer 60. In operation, in particular in normal operation and in the start-up phase, the guiding device 10 guides the flow of the burnt air/fuel mixture, in particular of the exhaust gas, to the turbine 33 and leads fuel to the reformer 60. The guiding device 10 therefore has a first flow path for the burnt air/fuel mixture and a second flow path for fuel.

According to FIG. 2 the guiding device 10 is configured in a ring-shaped manner and has a plurality of guide blades 11. The guide blades 11 are arranged evenly distributed in circumferential direction of the ring-shaped guiding device. The guide blades 11 are respectively spaced apart from adjacent guide blades 11, so that in operation the burnt air/fuel mixture flows through between the guide blades 11.

As can be readily seen in FIG. 2, the guide blades 11 have respectively a passage 12. In other words, the guide blades 11 are constructed to be hollow. The passage 12 forms a flow channel for fuel which is to be vaporized or for pre-vaporized fuel. The passage 12 can be formed by a slit. Additionally or alternatively, the passage 12 can be formed by one or more bores. Other forms of the passage 12 are possible. Generally it is conceivable that the guide blades 11 alternatively can have several passages 12 for the fuel which is to be vaporized or for pre-vaporized fuel.

The passage 12 forms a heat transfer zone 15 (see FIG. 3), in which, in operation, a heat transfer takes place from the guide blades 11 to the fuel which is flowing through. The heat transfer zone 15 comprises an inner face of the passage 12. The passage 12 runs transversely to the circumferential direction of the guiding device 10 through the guide blades 11. In other words, the passage 12 runs transversely to the flow direction S" of the burnt air/fuel mixture. Or, in other words, the passage 12 runs in a longitudinal direction of the guiding device 10. According to FIG. 2 the guiding device 10 forms a guide baffle.

In this practical embodiment, methanol or a methanol/water mixture is used as liquid fuel. This means that the vaporized fuel is vaporized methanol or a vaporized methanol/water mixture.

On the through-flowing of the liquid fuel in normal operation, i.e. when the operating temperature of the guiding device 10 is reached, a vaporizing of the fuel takes place. Through this process, the guiding device 10 is cooled and is thus protected from a thermal overload. The vaporized fuel is subsequently guided through the discharge line 14 to the reformer 60.

The reformer 60 is adapted to generate from the vaporized methanol or respectively the vaporized methanol/water mixture a synthesis gas with a heating value which is 10 percent to 25 percent higher than a heating value of the vaporized educt.

With a synthesis gas which is generated by the reformer 60 from vaporized methanol, the heating value is higher by 15 percent to 18 percent, particularly preferably by 18 percent to 20 percent, than the heating value of the vaporized methanol before the reforming. The reaction equation for methanol to synthesis gas is as follows: $CH_4O \rightarrow 2H_2 + CO$.

With a synthesis gas which is generated by the reformer from a vaporized methanol/water mixture, the heating value is higher by 10 percent to 12 percent, preferably by 12 percent to 14 percent, particularly preferably by 13 percent, than the heating value of the vaporized methanol/water mixture before the reforming. The reaction equation for the methanol/water mixture to synthesis gas is as follows: $CH_4O + H_2O \rightarrow CO_2 + 3H_2$.

The water content for the methanol/water mixture can be already added to the methanol before the guiding device 10 or added after the guiding device 10.

In order to provide the water content, the power unit 110 can have a condensation unit for generating condensate from an exhaust gas flow of the gas turbine 30. The condensation unit, which is not illustrated, is preferably connected to the gas turbine 30 at the exhaust gas side and/or is arranged on the gas turbine 30 at the exhaust gas side. In addition, the power unit 110 can comprise a feed unit, not illustrated, for feeding the condensate to the liquid and/or vaporized fuel.

According to FIG. 4 a drive system 100 is shown according to a further example embodiment according to the invention, wherein only the differences from the drive system 100 according to FIGS. 1 to 3 will be discussed below.

Figure 4:
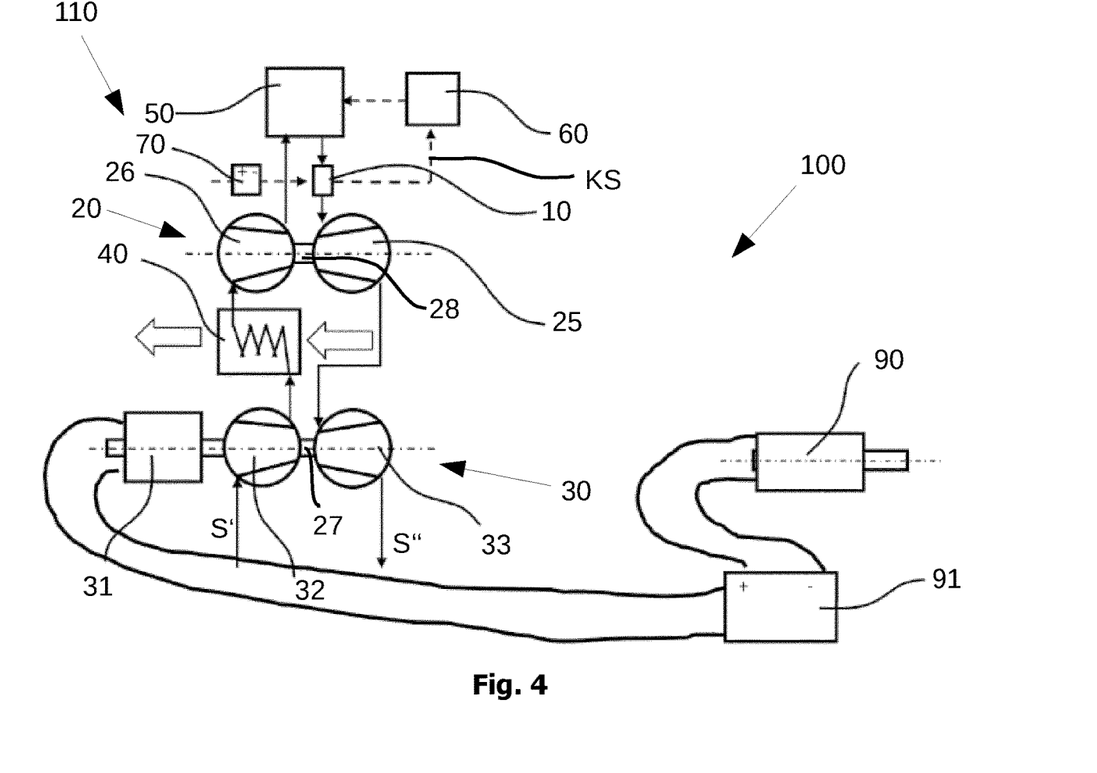
FIG. 4 a schematic illustration of a drive system according to a further example embodiment according to the invention.

The power unit 110 of the drive system 100 according to FIG. 4 additionally comprises an exhaust gas turbocharger 20 and an air cooler 40. The exhaust gas turbocharger 20 has a second compressor 26 and a turbine 25, which drives the second compressor 26. The turbine 25 is mechanically coupled to the second compressor 26. Specifically, the second compressor 26 and the turbine 25 are connected to one another for the transfer of a rotary movement via a shared shaft 28.

The second compressor 26 and the air cooler 40 are arranged in flow direction S' of the combustion air between the first compressor 32 and the combustion chamber 50. In other words, the second compressor 26 and the air cooler 40 are downstream of the first compressor 32 in flow direction S', and upstream of the combustion chamber 50. With the power unit 110 according to FIG. 4 therefore the first compressor 32 forms a first compressor stage for compressing the combustion air, and the downstream second compressor 26 forms a second compressor stage for the further compressing of the combustion air. Between the two compressors 32, 26, through the air cooler 40, an intermediate cooling of the compressed combustion air takes place. The air cooler 40 is an air/air cooler. This means that the air cooler 40, for cooling the combustion air, is flowed through with air, for example ambient air, in order to realize an air discharge. The power unit 110 according to FIG. 4 therefore comprises a two-stage compressing of the combustion air with intermediate cooling before entry into the combustion chamber 50.

The turbine 25 of the exhaust gas turbocharger 20 is arranged in flow direction S" of the burnt air/fuel mixture between the guiding device 10 and the turbine 33 of the gas turbine 30. With the power unit 110 according to FIG. 4, the guiding device 10 is provided on the turbine 25 of the exhaust gas turbocharger 20 and not, as shown in FIG. 1, on the turbine 33 of the gas turbine 30. Nevertheless, with regard to the guiding device 10 according to FIG. 4 reference is to be made to the description concerning the guiding device 10 according to FIGS. 1 to 3. The arrangement of the guiding device 10 on the turbine 25 corresponds to the arrangement of the guiding device 10 on the turbine 33 according to FIGS. 1 and 3. The configuration and function of the guiding device 10 according to FIG. 4 is the same as described with the aid of FIGS. 1 to 3.

Additionally or alternatively, the guiding device 10 can be arranged on the turbine 33. In other words, it is possible that with the power unit 110 as a whole two guiding devices 10 can be provided, wherein respectively one of the guiding devices 10 is arranged on one of the turbines 25, 33. According to FIG. 4 the guiding device 10 is only arranged on the turbine 25 of the exhaust gas turbocharger 20. This can be readily seen in FIG. 3.

Figure 5:
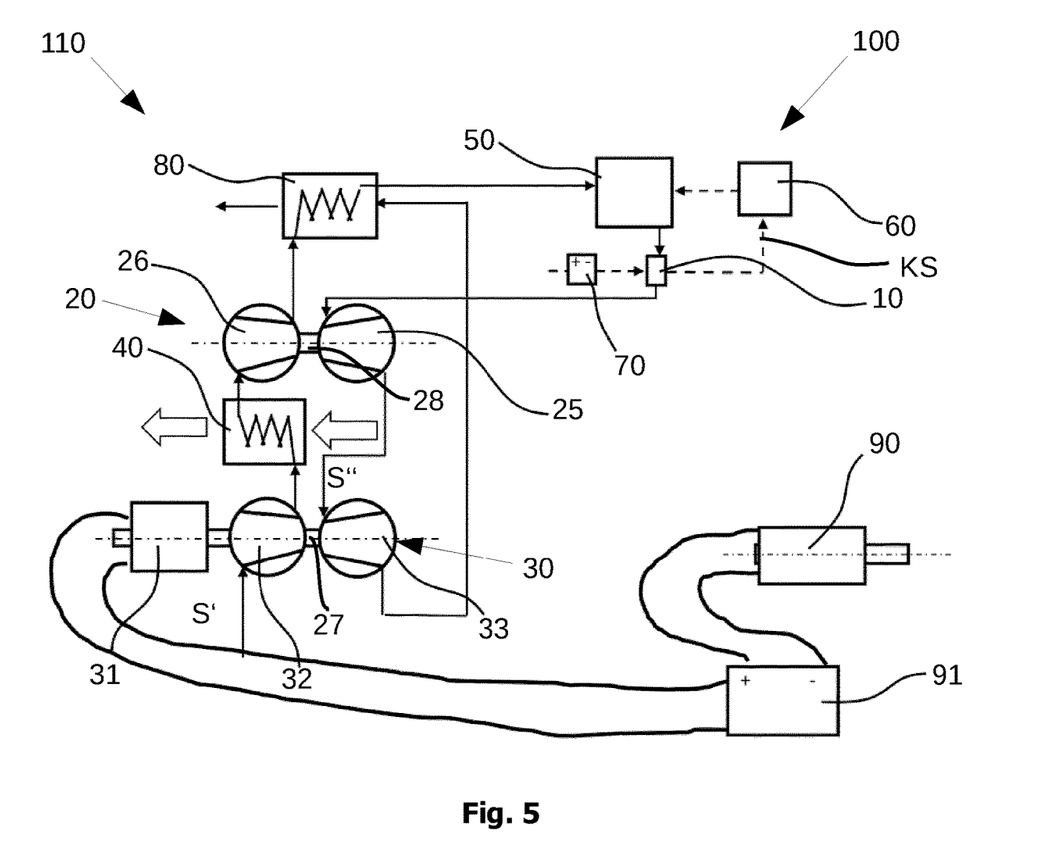
FIG. 5 a schematic illustration of a drive system according to a further example embodiment according to the invention.

FIG. 5 shows a drive system 100 according to a further example embodiment according to the invention, in which the drive system according to FIG. 4 is supplemented by a heat exchanger 80 for pre-heating the combustion air.

With the power unit 110 according to FIG. 5, the heat exchanger 80 is upstream of the combustion chamber 50. Specifically, the heat exchanger 80 is arranged in flow direction S' of the combustion air between the second compressor 26 of the exhaust gas turbocharger 20 and the combustion chamber 50. The heat exchanger 8 is adapted to heat the compressed combustion air to an ignition temperature of the synthesis gas generated by the reformer 60.

The heat exchanger 80 is connected to the turbine 33 at the exhaust gas side. Furthermore, the heat exchanger 80 is connected to the second compressor 26. The heat exchanger 80 is flowed through by the burnt air/fuel mixture or respectively the exhaust gas out of the turbine 33 and thereby heats the compressed combustion air. The heat exchanger 80 therefore leads a heating of the combustion air by means of thermal recuperation using the exhaust gas flowing out of the turbine 33.

With the power unit 110 according to FIG. 5, the combustion chamber 50 is adapted to accelerate the combustion air to a speed which is higher than a flame speed of the synthesis gas which is to be burned. Thereby, in the combustion chamber 50 the combustion of the air/fuel mixture can take place by means of flameless oxidation. It is advantageous here that almost no nitrogen oxides occur and thus an improved, climate-friendly operation of the drive system 100 is enabled.

Finally, it is pointed out that the features of the two described example embodiments are not restricted to the individual example embodiments, but are able to be freely combined with one another.

LIST OF REFERENCE NUMBERS

10 guiding device
11 guide blades
12 passage
13 feed line
14 discharge line
15 heat transfer zone
20 exhaust gas turbocharger
21 turbine volute
22 turbine wheel
23 turbine blades
24 bearing support
25 turbine
26 second compressor
27 turbine shaft
28 shared shaft
30 gas turbine
31 generator
32 first compressor
33 turbine
40 air cooler
50 combustion chamber
60 reformer
70 electric vaporizer
80 heat exchanger
90 electric motor
91 drive battery
100 drive system
110 power unit
KS fuel flow direction
S' flow direction of the combustion air
S" flow direction of the burnt air/fuel mixture

The invention claimed is:

1. A drive system for a vehicle having at least one power unit electrically coupled to at least one drive battery, the power unit comprising:
at least one gas turbine including at least one combustion chamber adapted to burn an air/fuel mixture, the combustion chamber fluid-connected between at least one first compressor adapted to compress aspirated combustion air and at least one turbine adapted to drive the first compressor;
at least one reformer adapted to generate a vaporized fuel into a synthesis gas, the reformer connected to the combustion chamber to supply the synthesis gas; and
at least one generator mechanically coupled to the gas turbine to one of accept or introduce a rotary movement,
wherein the drive battery is electrically connected to the generator of the power unit and adapted to supply electrical energy to one of (i) at least one electric motor to drive the vehicle or (ii) the generator;
wherein the gas turbine further includes at least one guiding device adapted to guide a flow of burnt air/fuel mixture, the guiding device arranged in a first flow direction between the combustion chamber and the turbine, and
wherein the guiding device is upstream of the reformer in a fuel flow direction, the guiding device operationally adapted to receive heat from the burnt air/fuel mixture and to vaporize a liquid fuel through heat transfer.

2. The drive system according to claim 1, wherein the guiding device has a plurality of guide blades each respectively having at least one passage connected to a feed line for one of the liquid fuel or a pre-vaporized fuel and to a discharge line for vaporized fuel, wherein the passage forms a heat transfer zone adapted to vaporize the liquid fuel.

3. The drive system according to claim 1, wherein the reformer is adapted to generate the synthesis gas from the vaporized fuel, the synthesis gas having a heating value of 10 percent to 25 percent higher than a heating value of the vaporized fuel.

4. The drive system according to claim 1, wherein the power unit has at least one condensation unit adapted to generate condensate from an exhaust gas flow of the gas turbine, the condensation unit one of connected to the gas turbine at an exhaust gas side or arranged on the gas turbine, the power unit further including at least one feed unit adapted to feed the condensate to one of the liquid fuel or vaporized fuel.

5. The drive system according to claim 1, wherein the power unit further includes at least one electric vaporizer arranged upstream of the guiding device in the fuel flow direction and adapted to vaporize the liquid fuel.

6. The drive system according to claim 1, wherein the power unit further includes at least a second compressor and at least one air cooler arranged in a second flow direction of the combustion air between the first compressor and the combustion chamber, wherein the air cooler is upstream of the second compressor.

7. The drive system according to claim 6, wherein the power unit further includes at least one heat exchanger adapted to pre-heat the compressed combustion air, the heat exchanger arranged between the combustion chamber and one of the second compressor or the first compressor, and wherein the heat exchanger is connected to the gas turbine at an exhaust gas side for heat transfer.

8. The drive system according to claim 7, wherein the heat exchanger is adapted to heat the compressed combustion air at least to an ignition temperature of the synthesis gas generated by the reformer.

9. The drive system according to claim 1, wherein the combustion chamber is adapted to accelerate the combustion air to a speed higher than a flame speed of the synthesis gas for burning the synthesis gas.

10. The drive system according to claim 1, wherein at least one electric motor is connected to the drive battery and adapted to drive the vehicle.

11. A method for operating a drive system having at least one power unit that includes at least one gas turbine, at least one reformer and at least one generator, the drive system further having at least one drive battery electrically connected to the generator of the power unit, the method comprising:
    aspirating combustion air through at least a first compressor of the gas turbine adapted to compress the combustion air;
    feeding the compressed combustion air to a combustion chamber arranged between the first compressor and a turbine of the gas turbine;
    vaporizing a liquid fuel through at least one guiding device operationally adapted to receive heat from a burnt air/fuel mixture from the combustion chamber and transfer the heat to a through-flowing fuel;
    feeding the vaporized fuel to the reformer, the reformer adapted to convert the vaporized fuel into a synthesis gas and feed the synthesis gas to the combustion chamber;
    burning an air/fuel mixture in the combustion chamber, the burnt air/fuel mixture driving the turbine of the gas turbine;
    transferring a rotary movement from the gas turbine to the generator to generate electrical energy; and
    storing the electrical energy in the drive battery to supply one of at least one electric motor or the generator with electrical energy.

12. The method according to claim 11, wherein before the feeding to the combustion chamber, the compressed combustion air is further compressed by at least a second compressor of the power unit, wherein before the further compressing, the combustion air is cooled by at least one air cooler arranged in a flow direction of the combustion air between the first compressor and the second compressor.

13. A hybrid vehicle with at least one drive system having at least one power unit electrically coupled to at least one drive battery connected to at least one electric motor for driving the vehicle, the power unit comprising:
    at least one gas turbine including at least one combustion chamber adapted to burn an air/fuel mixture, the combustion chamber fluid-connected between at least one first compressor adapted to compress aspirated combustion air and at least one turbine adapted to drive the first compressor;
    at least one reformer adapted to generate a vaporized fuel into a synthesis gas, the reformer connected to the combustion chamber to supply the synthesis gas; and
    at least one generator mechanically coupled to the gas turbine to one of accept or introduce a rotary movement,
    wherein the drive battery is electrically connected to the generator of the power unit and adapted to supply electrical energy to one of (i) the at least one electric motor to drive the vehicle or (ii) the generator;
    wherein the gas turbine further includes at least one guiding device adapted to guide a flow of burnt air/fuel mixture, the guiding device arranged in a first flow direction between the combustion chamber and the turbine, and
    wherein the guiding device is upstream of the reformer in a fuel flow direction, the guiding device operationally adapted to receive heat from the burnt air/fuel mixture and to vaporize a liquid fuel through heat transfer.

14. The hybrid vehicle of claim 13, wherein the guiding device has a plurality of guide blades each respectively having at least one passage connected to a feed line for one of liquid fuel or pre-vaporized fuel and to a discharge line for vaporized fuel, wherein the passage forms a heat transfer zone adapted to vaporize the liquid fuel.

15. The hybrid vehicle of claim 13, wherein the power unit has at least one condensation unit adapted to generate condensate from an exhaust gas flow of the gas turbine, the condensation unit one of connected to the gas turbine at an exhaust gas side or arranged on the gas turbine, the power unit further including at least one feed unit adapted to feed the condensate to one of the liquid fuel or the vaporized fuel.

16. The hybrid vehicle of claim 13, wherein the power unit further includes at least one electric vaporizer arranged upstream of the guiding device in the fuel flow direction and adapted to vaporize the liquid fuel.

17. A passenger vehicle selected from a group consisting of a truck, a bus, an aircraft and a boat, and having a power unit electrically coupled to at least one drive battery connected to at least one electric motor for driving the vehicle, the power unit comprising:
    at least one gas turbine including at least one combustion chamber adapted to burn an air/fuel mixture, the combustion chamber fluid-connected between at least one first compressor adapted to compress aspirated combustion air and at least one turbine adapted to drive the first compressor;
    at least one reformer adapted to generate a vaporized fuel into a synthesis gas, the reformer connected to the combustion chamber to supply the synthesis gas; and
    at least one generator mechanically coupled to the gas turbine to one of accept or introduce a rotary movement,
    wherein the drive battery is electrically connected to the generator of the power unit and adapted to supply electrical energy to one of (i) at least one electric motor to drive the vehicle or (ii) the generator;
    wherein the gas turbine further includes at least one guiding device adapted to guide a flow of burnt air/fuel mixture, the guiding device arranged in a first flow direction between the combustion chamber and the turbine, and
    wherein the guiding device is upstream of the reformer in a fuel flow direction, the guiding device operationally adapted to receive heat from the burnt air/fuel mixture and to vaporize a liquid fuel through heat transfer.

18. The passenger vehicle of claim 17, wherein the guiding device has a plurality of guide blades each respectively having at least one passage connected to a feed line for one of liquid fuel or pre-vaporized fuel and to a discharge line for vaporized fuel, wherein the passage forms a heat transfer zone adapted to vaporize the liquid fuel.

19. The passenger vehicle of claim 17, wherein the power unit has at least one condensation unit adapted to generate condensate from an exhaust gas flow of the gas turbine, the condensation unit one of connected to the gas turbine at an exhaust gas side or arranged on the gas turbine, the power unit further including at least one feed unit adapted to feed the condensate to one of the liquid fuel or the vaporized fuel.

20. The passenger vehicle of claim 17, wherein the power unit further includes at least one electric vaporizer arranged upstream of the guiding device in the fuel flow direction and adapted to vaporize the liquid fuel.

\* \* \* \* \*

UNITED STATES PATENT AND TRADEMARK OFFICE
CERTIFICATE OF CORRECTION

| | | |
|---|---|---|
| PATENT NO. | : 12,305,572 B2 | Page 1 of 1 |
| APPLICATION NO. | : 18/687595 | |
| DATED | : May 20, 2025 | |
| INVENTOR(S) | : Andreas Knoop et al. | |

It is certified that error appears in the above-identified patent and that said Letters Patent is hereby corrected as shown below:

In the Specification

Column 2, Line 32:
"particular, the CO: balance for the operation of the vehicle"
Should read:
-- particular, the $CO_2$-balance for the operation of the vehicle --

Signed and Sealed this
Ninth Day of September, 2025

Coke Morgan Stewart
*Acting Director of the United States Patent and Trademark Office*